(12) United States Patent
Winokur

(10) Patent No.: US 10,592,326 B2
(45) Date of Patent: Mar. 17, 2020

(54) METHOD AND APPARATUS FOR DATA LOSS ASSESSMENT

(71) Applicant: AXXANA (ISRAEL) LTD., Tel Aviv (IL)

(72) Inventor: Alex Winokur, Ramat Gan (IL)

(73) Assignee: AXXANA (ISRAEL) LTD., Tel Aviv (IL)

(*) Notice: Subject to any disclaimer, the term of this patent is extended or adjusted under 35 U.S.C. 154(b) by 177 days.

(21) Appl. No.: 15/913,955

(22) Filed: Mar. 7, 2018

(65) Prior Publication Data

US 2018/0260265 A1  Sep. 13, 2018

Related U.S. Application Data

(60) Provisional application No. 62/468,402, filed on Mar. 8, 2017.

(51) Int. Cl.
  *G06F 11/00* (2006.01)
  *G06F 11/07* (2006.01)
  (Continued)

(52) U.S. Cl.
  CPC ........ *G06F 11/079* (2013.01); *G06F 11/0751* (2013.01); *G06F 11/0775* (2013.01);
  (Continued)

(58) Field of Classification Search
  CPC .............. G06F 11/079; G06F 11/1471; G06F 11/1662; G06F 11/2071; G06F 11/0727;
  (Continued)

(56) References Cited

U.S. PATENT DOCUMENTS 3,140,847 A  7/1964 Ames
5,027,104 A  6/1991 Reid
(Continued)

FOREIGN PATENT DOCUMENTS

EP  0420425 A2  4/1991
GB  2273180 A  6/1994
(Continued)

OTHER PUBLICATIONS

Nadporojski, G., "Review of GSM-telephone Benefon Twin+", published on http://www.ixbt.com, 6 pages, Jan. 9, 2001.
(Continued)

*Primary Examiner* — Philip Guyton
(74) *Attorney, Agent, or Firm* — Kligler & Associates Patent Attorneys Ltd

(57) ABSTRACT

A method, including receiving, by a secure processor housed in a disaster-proof casing located at a local site, recurring wireless signals from an application server and from a storage system that are collocated with the processor at the local site, the application server configured to store data to the primary storage system, and to mirror the data to a remote site, each of the wireless signals indicating a status of the application server or the storage system at a given time. A status log including the respective statuses of the application server and the storage system at the received times is stored to a memory in the casing, and subsequent to failures of the application server, the storage system and the mirroring, the status log analyzed to compute a data loss at the local site resulting from the failures of the application server, the storage system, and the mirroring.

37 Claims, 5 Drawing Sheets

(51) Int. Cl.
*G06F 11/16* (2006.01)
*G06F 11/20* (2006.01)

(52) U.S. Cl.
CPC ...... *G06F 11/0778* (2013.01); *G06F 11/0784* (2013.01); *G06F 11/1662* (2013.01); *G06F 11/2071* (2013.01); G06F 11/0709 (2013.01); G06F 11/0727 (2013.01); G06F 11/0757 (2013.01); G06F 11/2069 (2013.01); G06F 2201/805 (2013.01); G06F 2201/82 (2013.01)

(58) Field of Classification Search
CPC ............. G06F 11/0757; G06F 11/2069; G06F 11/2056; G06F 11/2064
See application file for complete search history.

(56) References Cited

U.S. PATENT DOCUMENTS

| | | | |
|---|---|---|---|
| 5,546,533 A | 8/1996 | Koyama | |
| 5,594,900 A | 1/1997 | Cohn et al. | |
| 5,623,597 A | 4/1997 | Kikinis | |
| 5,680,579 A | 10/1997 | Young et al. | |
| 5,724,501 A | 3/1998 | Dewey et al. | |
| 5,799,141 A | 8/1998 | Galipeau et al. | |
| 5,841,768 A | 11/1998 | Ozluturk et al. | |
| 5,889,935 A | 3/1999 | Ofek et al. | |
| 6,105,078 A | 8/2000 | Crockett et al. | |
| 6,144,999 A | 11/2000 | Khalidi et al. | |
| 6,158,833 A | 12/2000 | Engler | |
| 6,173,377 B1 | 1/2001 | Yanai et al. | |
| 6,226,651 B1 | 5/2001 | Masuda et al. | |
| 6,260,125 B1 | 7/2001 | McDowell et al. | |
| 6,298,290 B1 | 10/2001 | Abe et al. | |
| 6,324,654 B1 | 11/2001 | Wahl et al. | |
| 6,389,552 B1 | 5/2002 | Hamilton et al. | |
| 6,400,730 B1 | 6/2002 | Latif et al. | |
| 6,574,538 B2 | 6/2003 | Sasaki | |
| 6,580,450 B1 | 6/2003 | Kersting et al. | |
| 6,658,590 B1 | 12/2003 | Sicola et al. | |
| 6,684,306 B1 | 1/2004 | Nagasawa et al. | |
| 6,816,480 B1 | 11/2004 | Monroe et al. | |
| 6,842,825 B2 | 1/2005 | Geiner et al. | |
| 6,859,865 B2 | 2/2005 | De Margerie | |
| 6,954,875 B2 | 10/2005 | Liu | |
| 6,976,186 B1 | 12/2005 | Gardner | |
| 7,020,743 B2 | 3/2006 | Lee et al. | |
| 7,065,589 B2 | 6/2006 | Yamagami | |
| 7,111,189 B1 | 9/2006 | Sicola et al. | |
| 7,114,094 B2 | 9/2006 | Soejima | |
| 7,120,834 B1 | 10/2006 | Bishara | |
| 7,148,802 B2 | 12/2006 | Abbroscato et al. | |
| 7,185,228 B2 | 2/2007 | Achiwa | |
| 7,188,292 B2 | 3/2007 | Cordina et al. | |
| 7,293,154 B1 | 11/2007 | Karr et al. | |
| 7,302,506 B2 | 11/2007 | Harima et al. | |
| 7,383,405 B2 | 6/2008 | Vega et al. | |
| 7,386,376 B2 | 6/2008 | Basir et al. | |
| 7,451,355 B1 | 11/2008 | Coatney et al. | |
| 7,478,266 B2 | 1/2009 | Gatto et al. | |
| 7,487,311 B2 | 2/2009 | Stroberger et al. | |
| 7,523,149 B1 | 4/2009 | Sridharan et al. | |
| 7,548,560 B1 | 6/2009 | Dropps et al. | |
| 7,577,724 B1 | 8/2009 | Jalagam et al. | |
| 7,577,807 B2 | 8/2009 | Rowan et al. | |
| 7,657,578 B1 | 2/2010 | Karr et al. | |
| 7,668,177 B1 | 2/2010 | Trapp et al. | |
| 7,707,453 B2 | 4/2010 | Winokur | |
| 7,707,460 B2 | 4/2010 | Hyde, II et al. | |
| 7,797,582 B1 | 9/2010 | Stager et al. | |
| 7,984,327 B2 | 7/2011 | Winokur | |
| 7,996,709 B2 | 8/2011 | Winokur | |
| 8,015,436 B2* | 9/2011 | Winokur ............. | G06F 11/1443 714/42 |
| 8,285,835 B1* | 10/2012 | Deolasee ............. | G06F 11/324 709/224 |
| 8,289,694 B2 | 10/2012 | Winokur | |
| 8,762,341 B1 | 6/2014 | Mahajan et al. | |
| 8,914,666 B2 | 12/2014 | Winokur | |
| 9,021,124 B2 | 4/2015 | Winokur | |
| 9,195,397 B2 | 11/2015 | Winokur et al. | |
| 2001/0044795 A1 | 11/2001 | Cohen et al. | |
| 2001/0047412 A1 | 11/2001 | Weinman | |
| 2002/0103816 A1 | 8/2002 | Ganesh et al. | |
| 2002/0162112 A1 | 10/2002 | Javed | |
| 2002/0176417 A1 | 11/2002 | Wu et al. | |
| 2002/0188392 A1 | 12/2002 | Breed et al. | |
| 2003/0014523 A1 | 1/2003 | Teloh et al. | |
| 2003/0037034 A1 | 2/2003 | Daniels et al. | |
| 2003/0093541 A1 | 5/2003 | Lolayekar et al. | |
| 2003/0097607 A1 | 5/2003 | Bessire | |
| 2003/0115324 A1 | 6/2003 | Blumenau et al. | |
| 2003/0204597 A1 | 10/2003 | Arakawa et al. | |
| 2004/0012316 A1 | 1/2004 | Davis | |
| 2004/0030837 A1 | 2/2004 | Geiner et al. | |
| 2004/0044649 A1 | 3/2004 | Yamato et al. | |
| 2004/0044865 A1 | 3/2004 | Sicola et al. | |
| 2004/0059844 A1 | 3/2004 | Jones et al. | |
| 2004/0064639 A1 | 4/2004 | Sicola et al. | |
| 2004/0073831 A1 | 4/2004 | Yanai et al. | |
| 2004/0078637 A1 | 4/2004 | Fellin et al. | |
| 2004/0083245 A1 | 4/2004 | Beeler | |
| 2004/0153717 A1 | 8/2004 | Duncan | |
| 2004/0193658 A1 | 9/2004 | Kawamura et al. | |
| 2004/0193802 A1 | 9/2004 | Meiri et al. | |
| 2004/0230352 A1 | 11/2004 | Monroe | |
| 2004/0260873 A1 | 12/2004 | Watanabe | |
| 2004/0267516 A1 | 12/2004 | Jibbe et al. | |
| 2005/0005001 A1 | 1/2005 | Hara et al. | |
| 2005/0015657 A1 | 1/2005 | Sugiura et al. | |
| 2005/0027892 A1 | 2/2005 | McCabe et al. | |
| 2005/0055357 A1 | 3/2005 | Campbell | |
| 2005/0243609 A1 | 11/2005 | Yang et al. | |
| 2005/0257015 A1 | 11/2005 | Hiraiwa et al. | |
| 2005/0262170 A1 | 11/2005 | Girkar et al. | |
| 2005/0273565 A1 | 12/2005 | Hirakawa et al. | |
| 2005/0280421 A1 | 12/2005 | Yomoda et al. | |
| 2006/0025897 A1 | 2/2006 | Shostak et al. | |
| 2006/0031468 A1 | 2/2006 | Atluri et al. | |
| 2006/0051157 A1 | 3/2006 | Bornstein et al. | |
| 2006/0072580 A1 | 4/2006 | Dropps et al. | |
| 2006/0075148 A1 | 4/2006 | Osaki | |
| 2006/0274755 A1 | 12/2006 | Brewer et al. | |
| 2006/0284214 A1 | 12/2006 | Chen | |
| 2007/0061379 A1 | 3/2007 | Wong et al. | |
| 2007/0079088 A1 | 4/2007 | Deguchi et al. | |
| 2007/0083657 A1 | 4/2007 | Blumenau | |
| 2007/0094467 A1 | 4/2007 | Yamasaki | |
| 2007/0124789 A1 | 5/2007 | Sachson et al. | |
| 2007/0180239 A1 | 8/2007 | Fujibayashi et al. | |
| 2007/0198613 A1 | 8/2007 | Prahlad et al. | |
| 2007/0226438 A1 | 9/2007 | Erofeev | |
| 2007/0025175 A1 | 11/2007 | Liu et al. | |
| 2007/0266197 A1 | 11/2007 | Neyama et al. | |
| 2007/0271313 A1 | 11/2007 | Mizuno et al. | |
| 2008/0001128 A1 | 1/2008 | Goldberg | |
| 2008/0004904 A1 | 1/2008 | Tran | |
| 2008/0061963 A1 | 3/2008 | Schnitz et al. | |
| 2008/0104443 A1 | 5/2008 | Akutsu et al. | |
| 2008/0177964 A1 | 7/2008 | Takahashi et al. | |
| 2008/0184068 A1 | 7/2008 | Mogi et al. | |
| 2008/0201390 A1 | 8/2008 | Anguelov | |
| 2008/0263363 A1 | 10/2008 | Jueneman et al. | |
| 2008/0297346 A1 | 12/2008 | Brackman et al. | |
| 2009/0007192 A1 | 1/2009 | Singh | |
| 2009/0313503 A1 | 12/2009 | Atluri et al. | |
| 2010/0121824 A1 | 5/2010 | Kawamura et al. | |
| 2011/0026527 A1 | 2/2011 | Shao et al. | |
| 2011/0131186 A1 | 6/2011 | Whisenant | |
| 2011/0276578 A1 | 11/2011 | Allalouf et al. | |
| 2012/0124311 A1 | 5/2012 | Winokur | |
| 2013/0016721 A1 | 1/2013 | Bill et al. | |
| 2014/0201142 A1 | 7/2014 | Varadharajan et al. | |
| 2014/0222971 A1* | 8/2014 | Cooper ................. | H04L 67/12 709/219 |

(56) References Cited

U.S. PATENT DOCUMENTS

| | | | |
|---|---|---|---|
| 2015/0248308 A1* | 9/2015 | Little | G06F 16/2358 707/703 |
| 2016/0147614 A1 | 5/2016 | Mittal et al. | |
| 2016/0224434 A1 | 8/2016 | Winokur | |
| 2016/0357639 A1 | 12/2016 | Winokur | |

FOREIGN PATENT DOCUMENTS

| | | |
|---|---|---|
| JP | H05-233413 A | 9/1993 |
| JP | 2004164094 A | 6/2004 |
| JP | 200571068 A | 3/2005 |
| RU | 2128854 C1 | 4/1999 |
| RU | 2221177 C2 | 1/2004 |
| WO | 01/97030 A1 | 12/2001 |
| WO | 2005022292 A2 | 3/2005 |
| WO | 2008049703 A2 | 5/2008 |
| WO | 2014170810 A2 | 10/2014 |

OTHER PUBLICATIONS

Goldfire Ltd., "Technology and Solutions Developed for Our Clients", 4 pages, Brussels, Belgium, 2009.

Firetrust, "FireTrust Technology", 4 pages, Brussels, Belgium, 2009.

EMC Corporation, "EMC SRDF Family: High-Performance remote replication for business continuity", 2 pages, USA (Sep. 6, 2006).

IBM Corporation, "Storage Solutions: Data Encryption within the Drive Itself", 2 pages, USA (Sep. 6, 2006).

"Flexible Min-K: Product Information", 2 pages, Thermal Ceramics Inc, Jan. 2008.

ANSI/INCITS standard 269-1996, "Information Technology—SCSI-3 Fibre Channel Protocol (FCP)", American Nationa Standards Institute (ANSI) and the International Committee for Information Technology Standards (INCITS), 77 pages, Apr. 8, 1996.

OracleTM—Database Backup and Recovery User's Guide, 11g Release 2 (11.2), E10642-06, 604 pages, May 2015.

OracleTM—Concepts, 11g Release 2 (11.2), E25789-01, 460 pages, Sep. 2011.

U.S. Appl. No. 15/169,811 office action dated Oct. 17, 2018.

EMC® Symmetrix® Remote Data Facility (SRDF®),Product Guide,Revision 04, 178 pages, Mar. 2014.

Oracle Data Guard 11g, "Data Protection and Availability for Oracle Database"—An Oracle Technical White Paper, 22 pages,Oct. 2011.

Veritas™ Volume Replicator Option by Symantec,"A Guide to Understanding Volume Replicator"—A technical overview of replication capabilities included in Veritas Storage Foundation™ and the Volume Replicator Option, 28 pages, 2006.

IBM., "OSDFSMS Advanced Copy Services", IBM document SC35-0428-15, Sixteenth Edition, 731 pages, Feb. 2009.

U.S. Appl. No. 14/916,190 office action dated Dec. 16, 2019.

* cited by examiner

METHOD AND APPARATUS FOR DATA LOSS ASSESSMENT

CROSS-REFERENCE TO RELATED APPLICATIONS

This application claims the benefit of U.S. Provisional Patent Application 62/468,402, filed Mar. 8, 2017, which is incorporated herein by reference.

FIELD OF THE INVENTION

The present invention relates generally to data storage, and particularly to computing a data loss resulting from a rolling disaster.

BACKGROUND OF THE INVENTION

In data storage, storage device mirroring replicates data stored on a primary data storage system to a secondary data storage system, in order to ensure redundancy. For a storage system comprising a pair of storage devices, mirroring can be implemented either synchronously or asynchronously. During synchronous mirroring, a host communicating with the storage system receives a write acknowledgement after data is successfully written to both of the mirrored storage devices. During asynchronous mirroring, the host receives the write acknowledgement after the data is written to a first of the mirrored storage devices, and the data can be written to a second of the mirrored storage devices at a later time.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including receiving, by a secure processor housed in a disaster-proof casing located at a local site, recurring wireless signals from a primary application server and from a primary storage system that are collocated with the disaster-proof casing at the local site, the primary application server configured to store data to the primary storage system, and to mirror the data to a secondary storage system at a remote site, each of the wireless signals indicating a status of the primary application server or the primary storage system at a given time, storing, to a memory in the disaster-proof casing, a status log including the respective statuses of the primary application server and the primary storage system at the received times, and subsequent to failures of the primary application server, the primary storage system and the mirroring, analyzing the status log to compute a data loss at the local site resulting from the failures of the primary application server, the primary storage system, and the mirroring.

In one embodiment, receiving the recurring wireless signals includes receiving recurring application status signals from the primary application server and receiving recurring storage status signals from the primary storage system. In some embodiments, the method may also include transmitting, by the secure processor, periodic wireless status request signals, wherein the primary application server transmits a given application status signal in response to receiving a given status request signal, and wherein the primary storage system transmits a given storage status signal in response to receiving the given status request signal.

In additional embodiments, a time period between the periodic wireless status requests signals is less than or equal to an input/output timeout period for the primary storage system. In further embodiments, mirroring the data includes the primary storage system mirroring the data to the secondary storage system at the remote site. In supplemental embodiments, the status of the primary storage system includes a status of the mirroring of the data to the remote site, wherein the status of the mirroring includes an amount of data not yet mirrored to the remote site.

In one embodiment, the mirroring includes asynchronous mirroring or synchronous mirroring. In some embodiments, the method may include receiving additional wireless signals from one or more active data center components that are collocated with the secure processor at the local site, each of the additional wireless signals indicating a status of a given active data center component at a given time, and storing, to the status log, the respective statuses of the one or more active data center components at the received times, wherein computing the data loss includes computing the data loss resulting from the failures, at different times, of the primary application server, the primary storage system, the mirroring, and the one or more active data center components.

In additional embodiments, the primary application server executes a software application, and wherein the status of the primary application server includes the status of the software application executing on the primary application server. In further embodiments, wherein the status of the primary application server includes a status of the mirroring of the data to the remote site, wherein the status of the mirroring includes an amount of data not yet mirrored to the remote site.

In supplemental embodiments, storing the status log includes storing, upon failing to receive within a specified time period, a wireless signal from the primary application server, an entry to the status log indicating a failure of the primary application server, and storing, upon failing to receive within a specified time period, a wireless signal from the primary storage system, an entry to the status log indicating a failure of the primary storage system. In some embodiments, the wireless signals include point-to-point wireless signals.

In one embodiment, the data loss is less than or equal to the data written, by the primary application server to the primary storage system, between respective times of the failures of the mirroring and the primary storage system. In additional embodiments, the data loss is less than or equal to the data written to the primary storage system between respective times of the mirroring and the primary application server.

In further embodiments, the recurring wireless signals include first wireless signals, wherein analyzing the status log includes transmitting, by the secure processor, a second wireless signal including the data log to a monitoring processor at the remote site, and analyzing, by the monitoring processor, the transmitted status log. In supplemental embodiments, the method may include generating a notification including the determined amount of data.

In some embodiments, the data loss includes a time period or an amount of data. In additional embodiments, the method may include mirroring the data to a secure memory housed in the disaster-proof casing, wherein the computing the data loss includes assessing a completeness of the data stored in the secure memory.

There is also provided, in accordance with an embodiment of the present invention a data recovery system including a disaster-proof casing, and a wireless transceiver contained within the disaster-proof casing and configured to receive recurring wireless signals from a primary application server and from a primary storage system that are collocated with the disaster-proof storage unit at a local site, the primary application server configured to store data to the primary storage system, and to mirror the data to a secondary storage system at a remote site, each of the wireless signals indicating a status of the primary application server or the primary storage system at a given time. The data recovery system also includes a memory contained within the disaster-proof casing, and a secure processor contained within the disaster-proof casing and configured to store, to the memory, a status log including the respective statuses of the primary application server and the primary storage system at the received times. The data recovery system additionally includes circuitry configured to analyze, subsequent to failures of the primary application server, the primary storage system and the mirroring, the status log to compute a data loss at the local site resulting from the failures of the primary application server, the primary storage system, and the mirroring.

There is further provided, in accordance with an embodiment of the present invention a computer software product, the product including a non-transitory computer-readable medium, in which program instructions are stored, which instructions, when read by a computer, cause the computer to receive, by a processor housed in a disaster-proof casing located at a local site, recurring wireless signals from a primary application server and from a primary storage system that are collocated with the disaster-proof casing at the local site, the primary application server configured to store data to the primary storage system, and to mirror the data to a secondary storage system at a remote site, each of the wireless signals indicating a status of the primary application server or the primary storage system at a given time, to store, to a memory in the disaster-proof casing, a status log including the respective statuses of the primary application server and the primary storage system at the received times, and subsequent to failures of the primary application server, the primary storage system and the mirroring, to analyze the status log to compute a data loss at the local site resulting from the failures of the primary application server and the primary storage system, and the mirroring.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
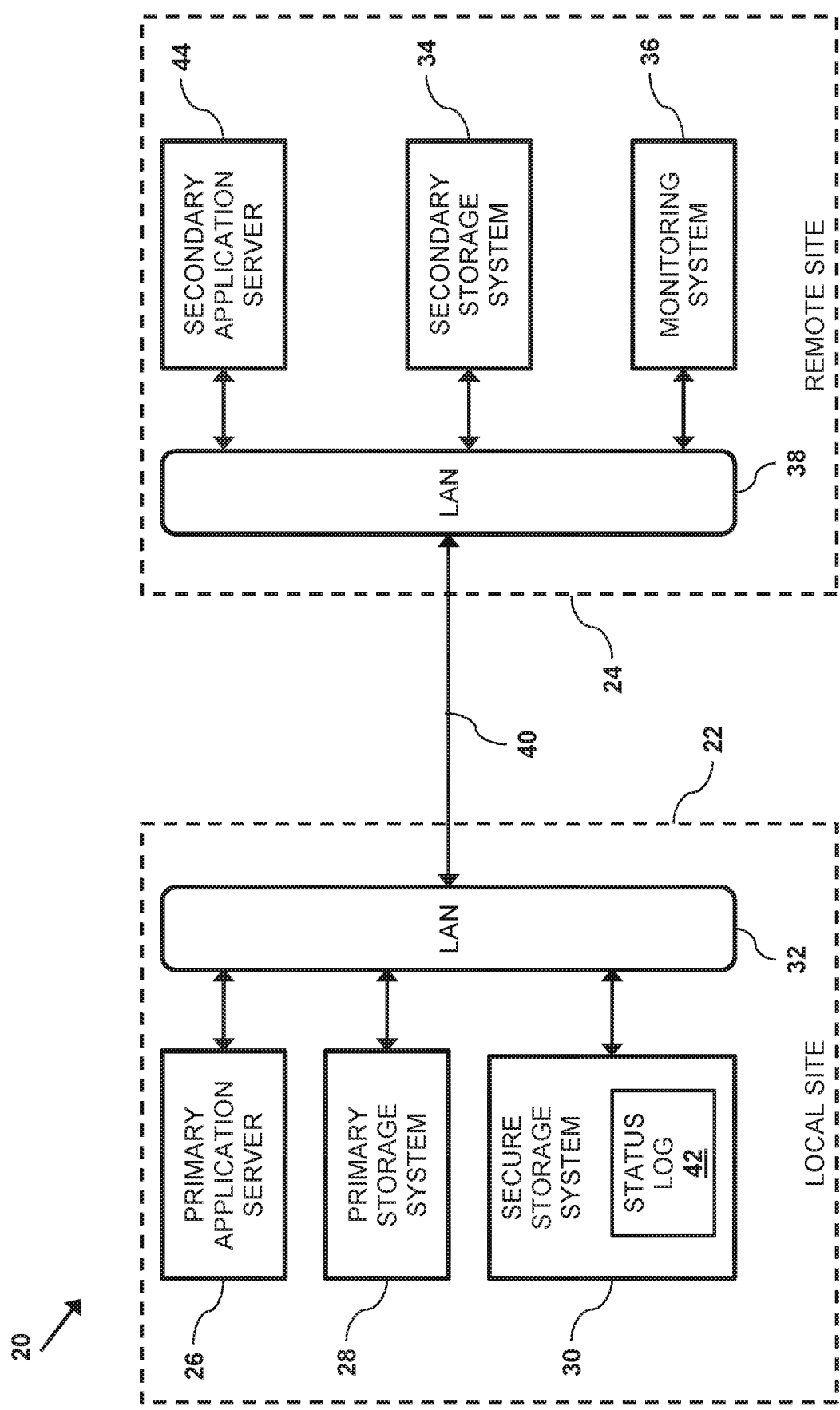
FIG. 1 is a block diagram that schematically shows a data storage facility comprising a local data center that mirrors data to a remote data center, in accordance with an embodiment of the present invention.

While processing application server (e.g., database server or email server) data writes, and mirroring the data writes from a primary storage system collated with the application server at a local site to a secondary storage system at a remote site, there may be occasional communication failures between the local and the remote sites.

While storing data to the primary storage system, an input/output (I/O) timeout period starts upon a write request being conveyed from the application server to the primary storage system. If the application server does not receive a write acknowledgement from the primary storage system, the application server will classify this data write as having failed.

Similarly, when mirroring from the application server to the secondary storage system, the application server will classify a mirroring operation as having failed if it does not receive a mirroring acknowledgement from the secondary storage system within the I/O timeout period. Likewise, when mirroring from the primary storage system to the secondary storage system, the primary storage system will classify a mirroring operation as having failed if it does not receive a mirroring acknowledgement from the secondary storage system within the I/O timeout period.

In addition to communication failures and mirroring failures, there may be additional failures at the local site. In some instances, for example during disasters such as floods and fires, the disaster may be classified as a "rolling disaster". During a rolling disaster, operations are interrupted in stages that can occur over several seconds or over several minutes. For example, during a rolling disaster, there will typically be different times when the application server fails, when the primary storage system fails, and when a communication line (used for mirroring) to the remote site fails.

Embodiments of the present invention provide data recovery methods and systems for determining an amount (if any) of data that is lost due to a rolling disaster at a local site comprising a primary application server, a primary storage system and a data connection. In operation, the primary application server conveys data to the primary storage system that stores and mirrors the data, via the data connection, to a secondary storage system at a remote site. In some embodiments, the primary application server can mirror the data to the secondary storage system by transmitting the data to a secondary application server that is collocated with the secondary storage system at the remote site. Upon receiving the mirrored data, the secondary application server stores the mirrored data to the secondary storage system.

As described hereinbelow, a secure storage system receives recurring wireless signals from the primary application server and from the primary storage system that are collocated with the secure storage system at the local site, each of the wireless signals indicating a status of the primary application server or the primary storage system at a given time. A status log comprising the respective statuses of the primary application server and the primary storage system at the received times is stored to the secure storage system. Subsequent to failures of the primary application server, the primary storage system and the mirroring, the status log can be analyzed to compute a data loss at the local site resulting from the failures of the primary application server, the primary storage system and the mirroring.

The following are three example scenarios of sequences of failures due to a rolling disaster:
1. Prior to a loss of communication between the local and the remote sites, the remote site receives an indication of a failure of the primary storage system. There is no data loss in this scenario.
2. Prior to a loss of communication between the local and the remote sites, an indication of replication failure (i.e., mirroring) was received at the remote site. There is data loss in this scenario. For example, if the primary storage system fails subsequent to the replication failure, then the data loss is (at most) all the write operations that occurred between the replication failure and the primary storage system failure. However, if communication between the sites is lost subsequent to the replication failure, then the data loss is difficult (if not impossible) to ascertain. This is because it is not possible to determine when the primary storage system failed.
3. Communication between the sites is lost first (i.e., before failures of the primary storage system and the primary application server). In this scenario, it is difficult (if not impossible) to ascertain how much data, if any, was lost.

Systems implementing embodiments of the present invention can rapidly (e.g., within a few minutes) compute a data loss resulting from a rolling disaster. For example, in the third scenario described supra, embodiments of the present invention can determine if any data was lost. Additionally, in the second scenario described supra, when communication is lost prior to the failure of the primary storage system, embodiments of the present invention can determine how much data was lost.

In some embodiments, systems implementing embodiments of the present invention can compute data losses as time units. For example, if five minutes of data was lost it means that all data written to the primary storage system in the last five minutes is lost. In alternative embodiments, systems implementing embodiments of the present invention can determine data losses as data-size units (e.g., in megabytes).

In additional embodiments, the ability to compute a data loss resulting from a rolling disaster can enable the primary storage system to shorten the I/O timeout period (e.g., from 30 to 10 seconds). Minimizing the I/O timeout period can reduce the impact of any I/O "hiccups", thereby increasing overall primary storage system performance.

System Description

Figure 2:
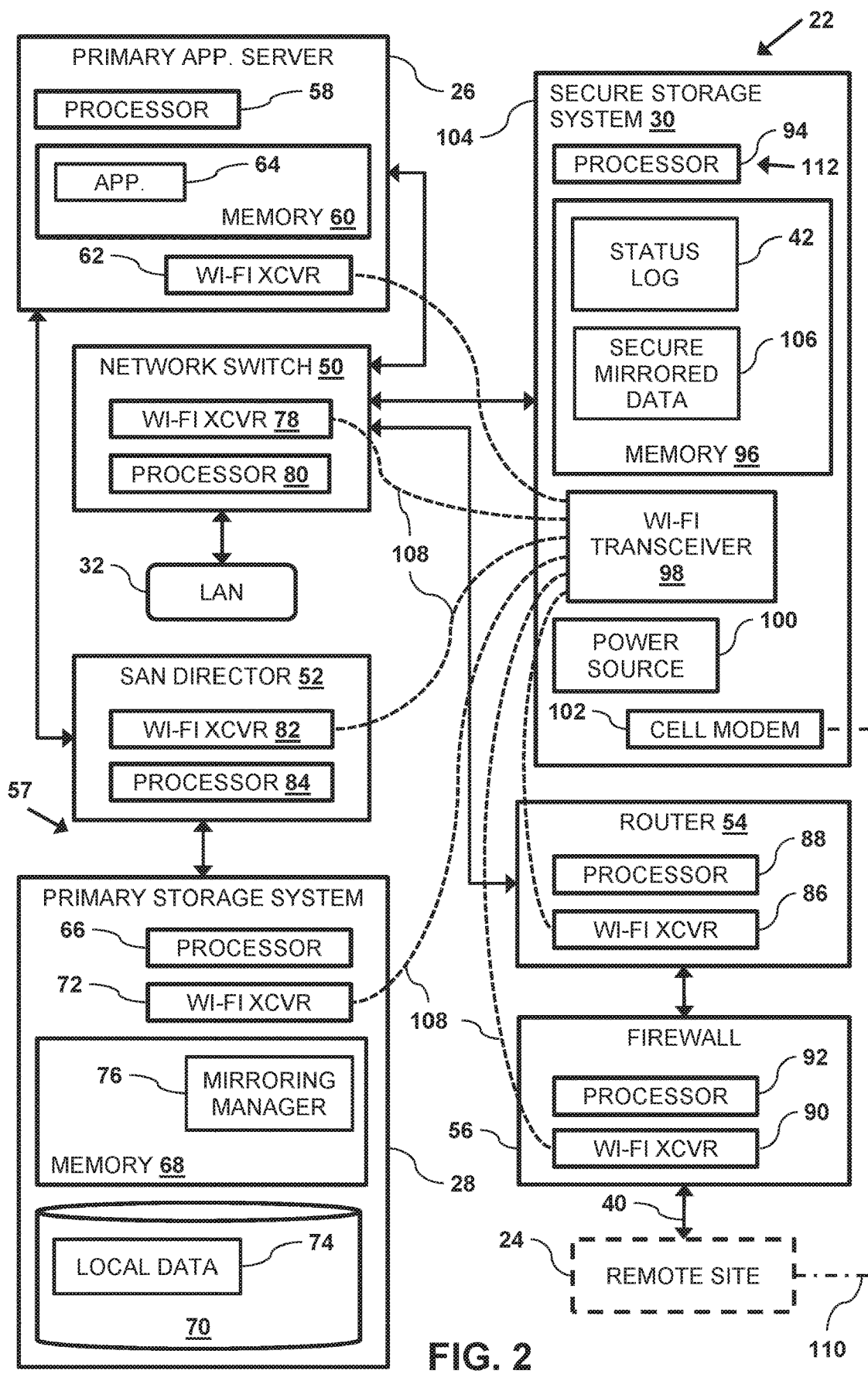
FIG. 2 is a block diagram that schematically shows the local data center comprising a secure storage system, in accordance with an embodiment of the present invention.

FIG. 1 is a block diagram that schematically shows a computing facility 20 comprising a local site 22 and a remote site 24, in accordance with an embodiment of the present invention. Local site 22 comprises a primary application server 26, a primary storage system 28 and a secure storage system 30 that communicate over a first local area network (LAN) 32 and over a storage area network, as shown in FIG. 2. Remote site comprises a secondary storage system 34 and a monitoring system 36, and a secondary application server 44 that communicate over a second LAN 38.

In operation, primary application server 26 stores data to primary storage system 28, and mirrors the data to secondary storage system 34 at remote site 24 via a data connection such as a wide area network (WAN). To mirror the data, primary application server 26 transmits the data to secondary application server 44 over data connection 40. Upon receiving the data, secondary application server 44 stores the received (i.e., mirrored) mirrored data on secondary storage system 34. In some embodiments primary application server 26 can also mirror the data to secure storage system 30 over LAN 32.

Primary application server 26, primary storage system 28 and secure storage system 30 are described in the description referencing FIG. 2 hereinbelow. Secondary storage system 34, monitoring system 36 and secondary application server 44 are described in the description referencing FIG. 3 hereinbelow.

In embodiments of the present invention, secure storage system 30 stores a status log 42. In the event of a failure of primary storage system 28 during a rolling disaster, as described in the description referencing FIG. 5 hereinbelow, monitoring system 36 can use cellular communications (as described in the description referencing FIGS. 2 and 3 hereinbelow) to retrieve status log 42 in order to initiate a data reconciliation process that can identify any data that was lost due to the rolling disaster.

FIG. 2 is a block diagram that schematically shows local site 22 comprising active data center components that are monitored by secure storage system 30, in accordance with an embodiment of the present invention. In embodiments of the present invention, the active data center components at local site 22 are any hardware components that (a) have a processor, and (b) whose failure can affect the completeness of data recovery following a disaster.

In the example presented in FIG. 2, the active data center components comprise primary application server 26, primary storage system 28, and communication equipment such as a network switch 50, a storage area network (SAN) director 52, a router 54, and a firewall 56. SAN director 52 and primary storage system 28 may be referred to collectively as a local SAN 57. SAN 57 typically comprises multiple primary storage systems 28. In some embodiments, as described hereinbelow, SAN 57 may also comprise secure storage system 30.

In some embodiments, as shown in FIG. 2, firewall 56 can couple network 32 to network 38 via router 54, primary application server 26 is coupled to primary storage system 28 via SAN director 52, and the primary application server, secure storage system 30, and router 54 are coupled to network 32 via network switch 50. In other configurations, secure storage system 30 can be coupled to either primary application server 26 or SAN director 52.

Primary application server 26 comprises a primary application processor 58, a primary application memory 60 and a primary Wi-Fi transceiver 62. While FIG. 2 shows primary application server 26 comprising processor 58, memory 60 and transceiver 62, the primary application server comprises other components (e.g., a NIC) that have been omitted from FIG. 2 for purposes of visual simplicity. In the configuration shown in FIG. 2, processor 58 executes, from memory 60, a primary software application 64 such as a database management system (DBMS) or an email server application.

Primary storage system 28 comprises a primary storage processor 66, a primary storage memory 68, a primary storage device 70 and a Wi-Fi transceiver 72. In the configuration shown in FIG. 2, processor 66 receives data 74 from application 64, stores the data to storage device 70, and processor 66 executes, from memory 68, a mirroring manager 76 that mirrors, either synchronously or asynchronously, the received data to secondary storage system 34. In some embodiments mirroring manager 76 can also mirror data to secure storage system 30.

Network switch 50 comprises a Wi-Fi transceiver 78 and a switch processor 80 that controls network switch circuitry (not shown). SAN director 52 comprises a Wi-Fi transceiver 82 and a SAN processor 84 that controls SAN director circuitry (not shown). Router 54 comprises a Wi-Fi transceiver 86 and a router processor 88 that controls router circuitry (not shown). Firewall 56 comprises a Wi-Fi transceiver 90 and a router processor 92 that controls router circuitry (not shown).

Secure storage system 30 comprises a secure processor 94, a secure memory 96, a Wi-Fi transceiver 98, a backup power source 100 and a cellular modem 102 that are all housed within a disaster-proof casing 104. Disaster-proof casing 104 protects and insulates components inside secure storage system 30 from disasters such as floods, fires, explosions, building collapses and earthquakes.

Memory 96 stores status log 42, and may also store secure mirrored data 106 that processor 94 receives from mirroring manager 76. The configuration and operation of secure storage system 30, as well as additional configurations of facility 20, is described in U.S. Pat. No. 7,707,453, to Winokur, whose disclosure is incorporated herein by reference.

In embodiments of the present invention, as explained hereinbelow, Wi-Fi transceiver 98 receives Wi-Fi signals 108 from Wi-Fi transceivers 62, 72, 78, 82, 86 and 90 indicating respective statuses of primary application server 26, network switch 50, SAN director 52, primary storage system 28, router 54 and firewall 56, and processor 94 stores the received statuses to status log 42. Additionally, following a rolling disaster, cellular modem 102 can transmit status log 42 to monitoring system 36 via a wireless cellular signal 110. Details of status log 42 are described in the description referencing FIG. 3 hereinbelow.

Computing facility 20 comprises circuitry 112 that is configured, subsequent to a rolling disaster, to analyze status log 42, and to compute a data loss resulting from the rolling disaster. In some embodiments, circuitry 112 comprises secure processor 94. An alternative embodiment for circuitry 112 is described in the description referencing FIG. 3 hereinbelow. Computing the data loss is described hereinbelow in the description referencing FIG. 5.

While the configuration in FIG. 2 shows local site 22 comprising a single instance of each the active data center components, other configurations of the local site are considered to be within the spirit and scope of the present invention. For example, local site 22 may comprise more than one primary application server 26 and more than one primary storage system 28. Additionally, in embodiments where processor monitors additional active data center components such as network switch 50, SAN director 52, router 54 and firewall 56, configurations of local site 22 comprising additional instances of one or more of these additional active data center components is considered to be within the spirit and scope of the present invention.

Figure 3:
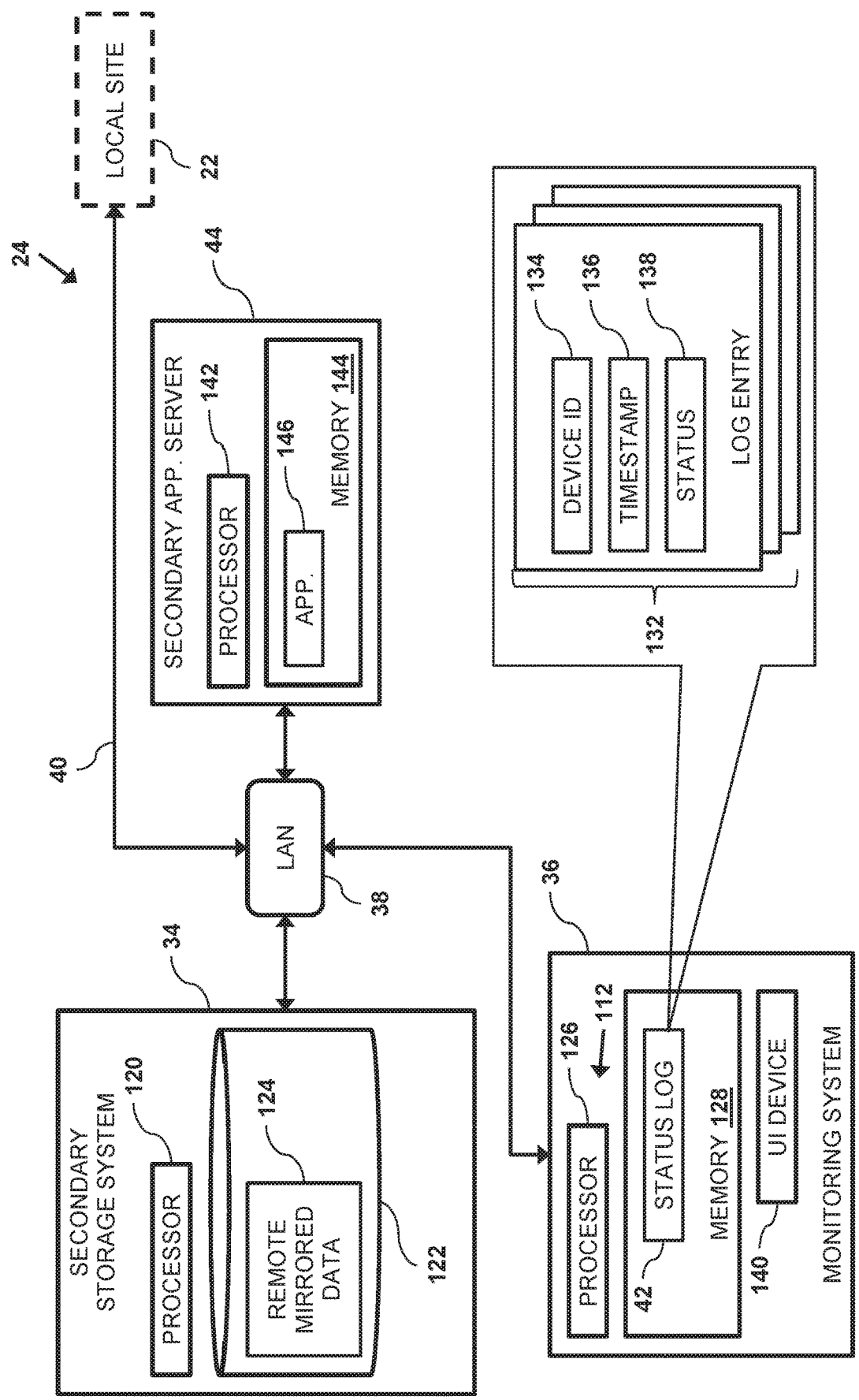
FIG. 3 is a block diagram that schematically shows the remote data center comprising a monitoring system, in accordance with an embodiment of the present invention.

FIG. 3 is a block diagram that schematically shows remote 24 comprising secondary storage system 34, monitoring system 36, and secondary application server 44 in accordance with an embodiment of the present invention. Remote site 24 typically comprises other components that have been omitted for purposes of visual simplicity. For example, remote site 24 may comprise components such as routers, network switches, and SAN directors that can be coupled to secondary storage system(s) 34 to implement a remote SAN.

Secondary storage system 34 comprises a secondary storage processor 120 and a secondary storage device 122. In operation, during mirroring operations, processor 120 receives data from either primary storage system 28 or secondary application server 44, and stores the received data to remote mirrored data 124.

Monitoring system 36 comprises a monitoring processor 126 and a monitoring memory 128. In some embodiments, monitoring system 36 may comprise a user interface (UI) device 140, such as a computer monitor. In embodiments of the present invention, monitoring system 36 can communicate, via data connection 40, with a cellular network provider (not shown) that can communicate, via signal 110, with cellular modem 102 in secure storage system 30.

Secondary application server 44 comprises a secondary application processor 142 and a secondary application memory 144. In the configuration shown in FIG. 3, processor 142 executes, from memory 144, a secondary software application 146 such as a DBMS or an email server application. In the event of a disaster, Secondary application server 44 can "take over" for primary application server 26.

Subsequent to a disaster, processor 126 receives status log 42 from secure storage system 30, and stores the received status log to memory 128. Status log 42 comprises multiple entries 132, each of the entries comprising a device identifier (ID) 134 (i.e., a unique identifier for each of the active data center components), a timestamp 136 and a status 138. Examples of statuses 138 include "alive" and "failed". In some embodiments, examples of statuses 138 for primary storage system 28 include "mirroring failed", "mirroring OK" and "number of megabytes lost".

Processors 58, 66, 80, 84, 88, 92, 94, 120, 126 and 142 comprise general-purpose central processing units (CPU) or special-purpose embedded processors, which are programmed in software or firmware to carry out the functions described herein. This software may be downloaded to the active data center components and to systems 26, 28, 30, 34, 36 and 44 in electronic form, over networks 32 and 38, for example. Additionally or alternatively, the software may be stored on tangible, non-transitory computer-readable media, such as optical, magnetic, or electronic memory media. Further additionally or alternatively, at least some of the functions of these processors may be carried out by hard-wired or programmable digital logic circuits.

Examples of memories 60, 68, 96, 128 and 144 include dynamic random-access memories and non-volatile random-access memories. In some embodiments, memories 60, 68, 96, 128, 144 and storage devices 70 and 122 may include non-volatile storage devices such as hard disk drives and solid-state disk drives.

While embodiments herein describe local site 22 using Wi-Fi transceiver 98 to communicate with Wi-Fi transceivers 62, 72, 78, 82, 86 and 88, using any other type of point-to-point short range wireless communication devices (e.g., Bluetooth™ wireless transceivers) to transmit status log 42 from the active data center components to secure storage system 30 is considered to be within the spirit and scope of the present invention. Using point-to-point wireless communication devices enables Wi-Fi transceiver 98 to communicate directly (i.e., via wireless signals 108) with the Wi-Fi transceivers in the active data components without any additional communication devices (e.g., wireless hubs) that function as signal repeaters. This eliminates effects of possible failures of the additional (i.e., intermediary) communication devices.

Additionally, while embodiments herein describe secure storage system 30 comprising cellular modem 102, using any other wireless communication devices (e.g., satellite, WiMAX and microwave transceivers) that can transmit status log 42 from the secure storage system in local site 22 to the monitoring system in remote site 24 (i.e., over long distances) is considered to be within the spirit and scope of the present invention.

Status Log Generation

Figure 4:
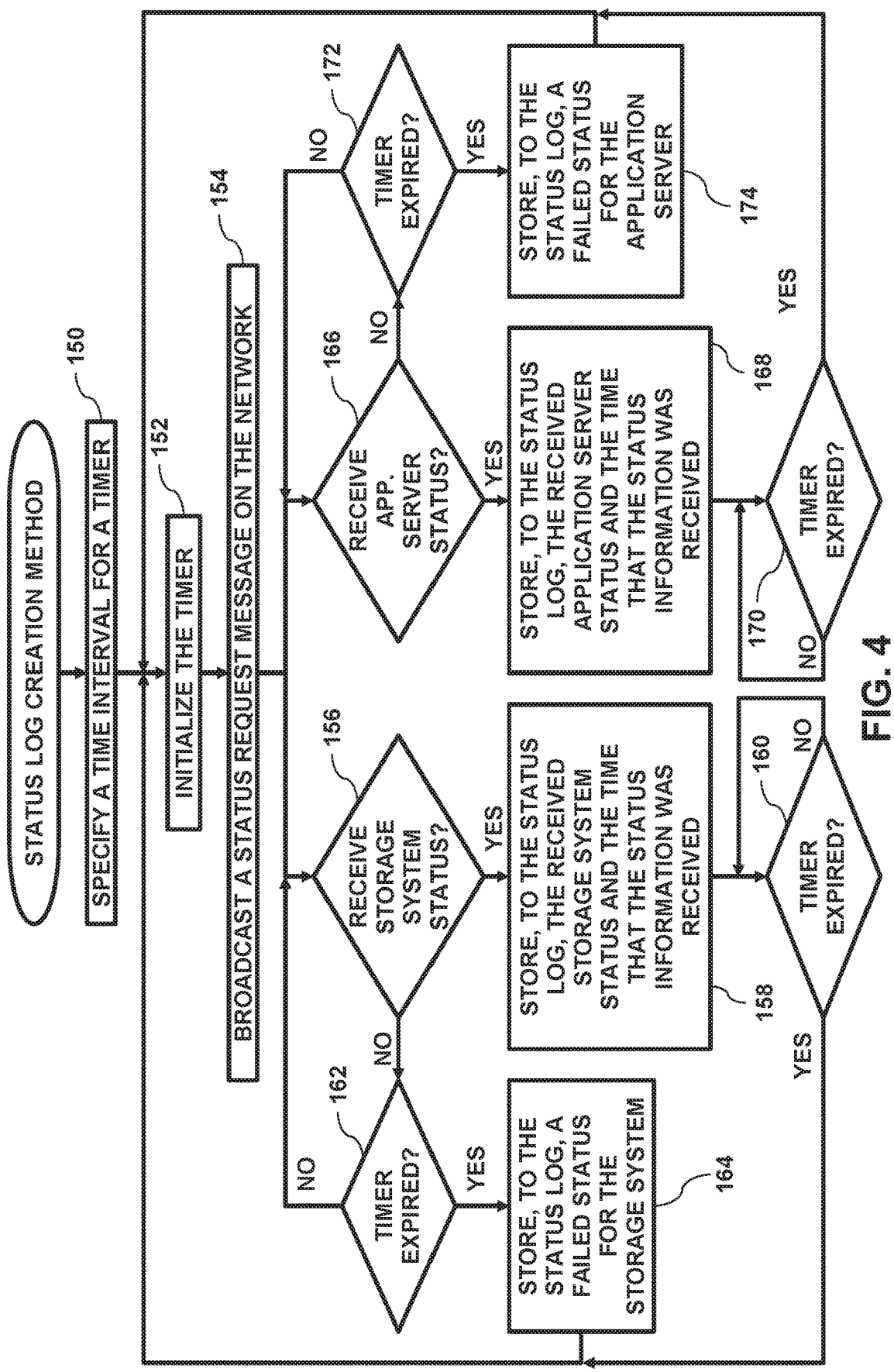
FIG. 4 is a flow diagram that schematically illustrates a method of maintaining an active status log on the secure storage system, in accordance with an embodiment of the present invention.

FIG. 4 is a flow diagram that schematically illustrates a method of generating status log 42, in accordance with an embodiment of the present invention. In a specification step 150, processor 94 specifies a time interval for a timer, and in an initialization step 152, the secure processor initializes the timer (e.g., sets the timer to zero). In some embodiments, the timer may comprise circuitry in processor 94 or a software application (not shown) that the secure processor 94 executes from memory 96, and the time interval may be a value be less than or equal to an I/O timeout period for storage facility 20.

In a broadcast step 154, processor 94 broadcasts, via Wi-Fi transceiver 98, a status request signal to all the active data center components in local site 22. In some embodiments processor 94 can broadcast the status request signal to each of the active data center components by conveying, via Wi-Fi transceiver 94, individual status request signals to each of the active data center components. In response to receiving the status request signal, each of the active data center components that are still operational transmits a status signal indicating their respective statuses.

In a first comparison step 156, if processor 94 receives a status signal from primary storage system 28 (i.e., in response to the broadcasted status request signal), then in a first storage step 158, the secure processor stores the current status indicated by the received signal to status log 42 in memory 96. To store the current status, processor 94 adds a new entry 132 to status log 42, and stores, to the new entry, an identifier (e.g., "store1" for primary storage system 28) to device ID 134, a time that the status signal was received to timestamp 136, and a current status indicated by the received status signal to status 138. Upon storing the current status of primary storage system 28 to status log 42, processor 94 waits, in a second comparison step 160, until the timer expires (i.e., the timer reaches the specified timer period), and the method continues with step 152.

Returning to step 156, if processor 94 did not yet receive a status signal from primary storage system 28, then in a third comparison step 162, the secure processor checks if the timer has expired. If the timer has not yet expired, then the method continues with step 156. However, if the timer has expired, then in a second storage step 164, processor 94 stores a new entry 132 to status log 42 indicating a failure of primary storage system 28 (i.e., since no status signal was received), and the method continues with step 152.

As described supra, steps 156-164 in FIG. 4 describe processor 94 determining the current status of primary storage system 28. The following steps 166-174 in FIG. 4 describe an embodiment comprising corresponding steps that the secure processor can execute (e.g., in a separate thread) to determine the current status of primary application server 26. In additional embodiments, steps 166-174 can be repeated for additional active data center components (e.g., additional primary application servers 26, additional primary storage systems 28, one or more network switches 50, one or more SAN directors 52, one or more routers 54 and one or more firewalls 56) in order to determine and to store their respective statuses to status log 42.

In a fourth comparison step 166, if processor 94 receives a status signal from primary application server 26 (i.e., in response to the broadcasted status request signal), then in a third storage step 168, the secure processor stores the current status indicated by the received signal to status log 42 in memory 96. In the example shown in FIG. 4, processor 94 performs step 166 concurrently with step 156 upon completing step 154.

To store the current status, processor 94 adds a new entry 132 to status log 42, and stores, to the new entry, an identifier (e.g., "app1" for primary application server 26) to device ID 134, a time that the status signal was received to timestamp 136, and a current status indicated by the received status signal to status 138. Upon storing the current status of primary application server 26 to status log 42, processor 94 waits, in a fourth comparison step 170, until the timer expires (i.e., the timer reaches the specified timer period), and the method continues with step 152.

Returning to step 166, if processor 94 did not yet receive a status signal from primary application server 26, then in a fifth comparison step 172, the secure processor checks if the timer has expired. If the timer has not yet expired, then the method continues with step 166. However, if the timer has expired, then in a fourth storage step 174, processor 94 stores a new entry 132 to status log 42 indicating a failure of primary application server 26 (i.e., since no status signal was received), and the method continues with step 152.

In embodiments described in FIG. 4, processor 92 "pulls" the status signals from the active data center components in local site 22 by periodically broadcasting, via Wi-Fi transceiver 98, the status request signal. In alternative embodiments, the active data center components can "push" the status signals by periodically broadcasting, via their respective Wi-Fi transceivers, signals indicating their respective current statuses.

In some embodiments, processor 94 can periodically delete older entries 132 in status log 42. In one such embodiment, processor 94 can delete entries having a specified age (e.g., entries 132 that are more than one day old). In another such embodiment, upon receiving a given status signal for a given active data center component, processor 94 can delete a previously stored entry 132 for the given active data center component, thereby only storing, in status log 42, the current statuses of the active data center components.

Status Log Based Data Reconciliation

Figure 5:
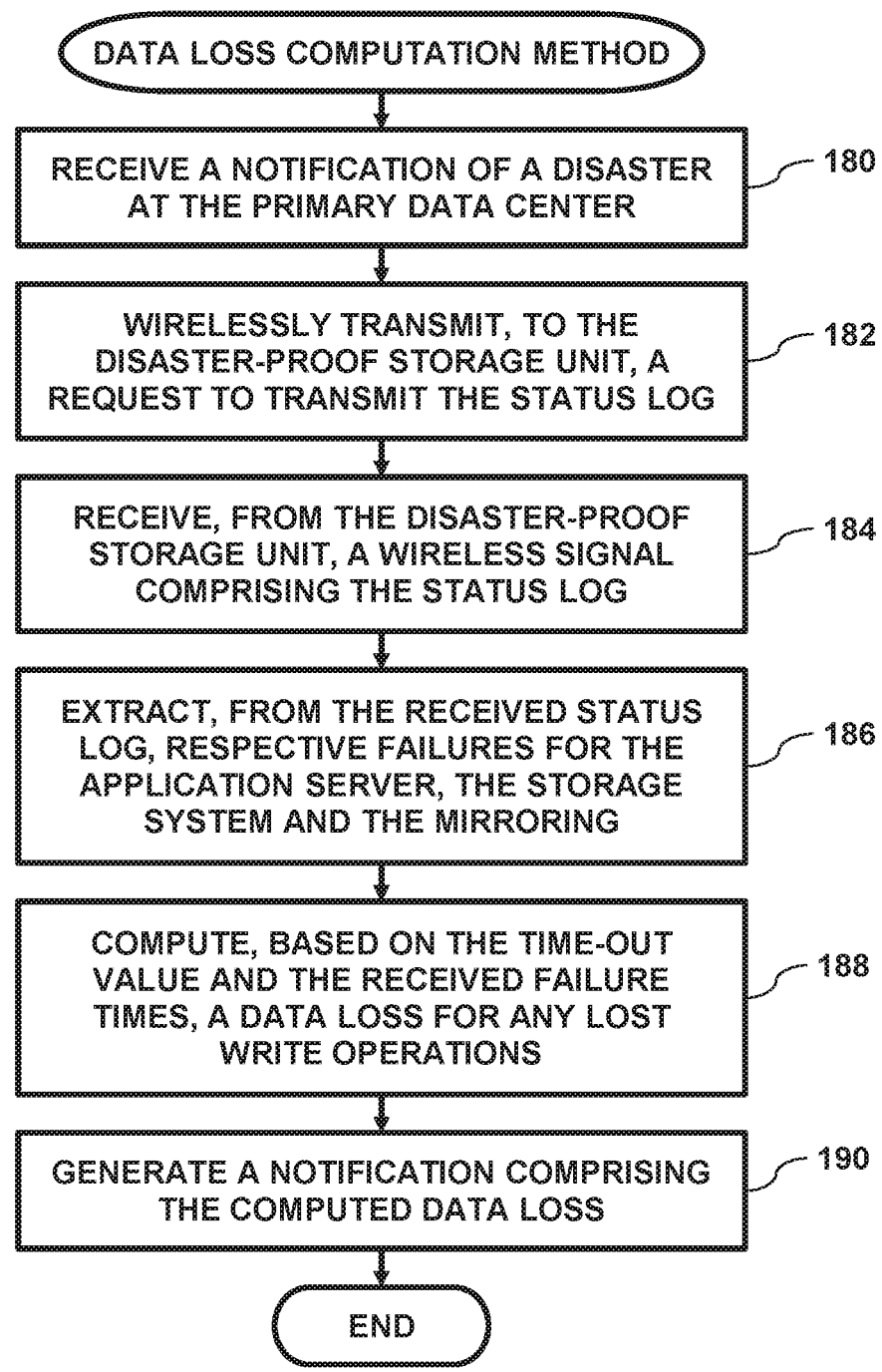
FIG. 5 is a flow diagram that schematically illustrates a method of using the status log to compute a data loss resulting from failures of multiple active data center components in the local data center, in accordance with an embodiment of the present invention.

FIG. 5 is a flow diagram that schematically illustrates a method of using status log 42 to compute a data loss resulting from a rolling disaster. In embodiments described herein, systems implementing embodiments of the present invention can analyze status log 42 to compute the data loss by determining an order of the failures during the rolling disaster.

In the event of a rolling disaster, data may be lost when mirroring fails before both primary storage system 28 and primary application server 26 fail. In one example, the computed data loss is less than or equal to all write operations to primary storage system 28 that occurred between respective failure times of the mirroring and the primary storage system. In another example, the computed data loss comprises all write operations that occurred between the time of the mirroring failure and the time of the primary application server failure.

In a notification step 180, processor 126 receives an explicit notification of a disaster, and in a transmission step 182, the monitoring processor transmits a status log request to secure storage system 30. In response to receiving the status log request, processor 94 uses cellular modem 102 to transmit status log 42 to monitoring system 36, and in a receiving step 184, processor 126 receives and stores the status log to memory 128. In an alternative embodiment, processor 94 can continuously monitor entries 132, and transmit status log 42 to monitoring system 36, thereby transmitting an implicit notification (i.e., based on the transmitted status log) of the disaster.

As described supra, each entry 132 in status log 42 comprises a status 138 for a given active data center component (indicated by a given device ID 134) at a given time 136. In some embodiments, the different statuses may comprise either "alive" (i.e., the given active data center device is functional) or "failed" (i.e., the given active data center device is not functional). In alternative embodiments, each active data center component can report additional statuses. For example, primary application server 26 and/or primary storage system 28 can report additional statuses such as:

"mirroring OK": Primary storage system 28 received, from secondary storage system 34, confirmations that all mirroring operations have been successfully completed.

"mirroring failed": Primary storage system 28 did not receive, from secondary storage system 34 within the I/O timeout value, that a given mirroring operation was successfully completed.

"number of megabytes lost": The number of megabytes lost comprises the number of megabytes of data accumulated in primary storage system 28 that the primary storage system has not transmitted yet to secondary storage system 34. Processor 66 can determine this number of megabytes on a per volume basis, on a per consistency group bases, or for primary storage system 28. The granularity of this measure can affect the accuracy of the lower limit of data loss estimate per particular primary application server 28.

In an extraction step 186, processor 126 extracts, from the received status log respective failure times of primary application server 26 and primary storage system 28. In some embodiments, a given entry 132 in status log 42 may also indicate a time of a mirroring failure between the primary and the secondary storage systems. Therefore, the current status of primary storage system 28 may also comprise the current status of the mirroring.

In a computation step 188, processor 126 uses the respective times of the failures to compute a data loss due the rolling disaster. In some embodiments, the data loss comprises an amount of time between the mirroring failure time and the failure time of any active data center component that prohibits completion of any additional write operations. If the failure of more than one of the active data center components prohibits write operations, then processor 126 can compute a tighter estimation based on which of these active data center components failed first. During a disaster, the active data center components typically fail at different respective times.

For example, if the log entries indicate that mirroring failed at 10:00, primary application server 26 failed at 10:05 and primary storage system 28 failed at 10:10, then the lost data was written to the primary storage system between 10:00 and 10:05. However, if the log entries show that SAN director 52 failed at 10:01, then primary application server 26 could not write data to primary storage system 28 after the failure of the SAN director, and the time period for the data loss is between 10:00-10:01.

As described supra, computing facility 20 comprises circuitry 112 that is configured, subsequent to a rolling disaster to analyze status log 42, and to compute a data loss resulting from the rolling disaster. In some embodiments, circuitry 112 comprises monitoring processor 126. In other embodiments, as described supra in the description referencing FIG. 2, circuitry 112 may comprise processor 94. Computing the data loss is described hereinbelow.

The following pseudo-code comprises data loss computations based on an assumption that a failure of either primary application server 26 or primary storage system 28 prohibits data writes:

```
Let t_s = the time of a failure of primary application server
  26;
Let t_D = the time of a failure of primary storage system 28;
Let t_m = the time of a mirroring failure;
Let t_Δ = the I/O timeout value;
  /* As described supra, following a mirroring failure of,
  primary storage system 28 will not acknowledge any write
  operations for at least t_Δ time period.*/
Let d_f = the amount of non-mirrored data;
  /* Upon a rolling disaster, d_f comprises the data loss
  (e.g., in megabytes) not yet replicated by primary storage
  system 28 to secondary storage system 34 */
IF (t_D - t_m) ≥ t_Δ THEN
  Data_Loss_Amount ≤ t_D - t_m;  /* Equation (1) */
  /* Data_Loss_Amount is less than or equal to all data
  write operations that occurred between the time of the
  mirroring failure and the time of the failure of primary
  storage system 28. */
  ELSEIF (t_m ≤ t_s ≤ t_D) and (t_s - t_m) ≥ t_Δ THEN
    Data_Loss_Amount ≤ (t_s - t_m);  /* Equation (2) */
    /* Data_Loss_Amount comprises all data write
    operations between the time of the mirroring failure
    and the time of the failure of primary application
    server 26. */
  ENDIF
ENDIF
IF Data_Loss_amount > 0 THEN
  extract d_f based on Data_Loss_Amount;
ENDIF
```

In some embodiments, the status information in log entries 132 for primary storage system 28 or mirroring manager 76 may include how much data was not yet mirrored to remote site 24. Circuitry 112 can extract this information (i.e., Data_Loss_Amount—the amount of non-mirrored data) to determine $d_f$.

On the other hand, in embodiments where processor 94 only receives status information from primary storage system 28, estimating the data loss will typically be less accurate than Equations (1) and (2) described supra. This lower accuracy is because a possible earlier failure of the primary application server cannot be determined. The following pseudo-code can be used in embodiments where processor 94 only receives status information from primary storage system 28:

```
IF (t_D - t_m) ≥ t_Δ THEN
  Data_Loss_Amount ≤ t_D - t_m;   /* Equation (1) */
  /* The maximum Data_Loss_Amount is comprises all data write
  operations that occurred between the time of the mirroring
  failure and the time of the failure of primary storage
```

```
system 28. */
ENDIF
```

Circuitry 112 can use Equation (1) when log entries 132 indicate failure times of mirroring, primary application server 26 and primary storage system 28, and can use Equation (2) when the log entries do not indicate when the application server failed. Therefore, since Equation (1) uses more information, it can provide a "tighter" window for the data failure. Therefore, the greater the number of active data center components whose respective statuses are included in status log 42, the more accurate (i.e., the tighter window for) the data loss.

In all other cases (i.e., if none of the "IF" conditions in the pseudo-code described hereinabove comprising Equations (1) and (2)), then no data is lost due to a disaster, and therefore the disaster is not a rolling disaster.

In addition to status information for active data components (i.e., hardware), the wireless signals processed by processor 94 may contain detailed status information for software executing on the active data center components (e.g., application 64 and mirroring manager 76), and use this detailed information to narrow down an estimate of an amount of time of a data loss. For example, if application 64 fails prior to primary application server 26, then processor 94 can determine that the primary application server did not issue any data writes from the time of the application failure (and not from the time of the primary application server failure). Therefore, incorporating, into the data loss computations, status information for a software application, can enable processor 94 to compute a more accurate data loss estimate.

Furthermore, in addition to receiving status information from primary application server 26 and primary storage system 28, processor 94 can also receive status information from software applications such as application 64 or mirroring manager 76, and/or receive status information from additional active data center components such as network switch 50, SAN director 52, router 54 and firewall 56. For example, if entries 132 indicate that all SAN directors 52 between primary storage system 28 and primary application server 26 failed before the failures of application 64 and primary storage system 28, then processor 126 can determine that data write operations to the primary storage system stopped earlier then the failure times of the application and the primary storage system.

As described supra, in addition to maintaining status log 42, secure storage system 30 can store, to secure mirrored data 106, data 74 conveyed by mirroring manager 76. In embodiments where secure storage system stores data 106, primary storage system 28 (or mirroring manager 76) can transmit a replication status (i.e., as part of its overall status) of the data mirrored to secure storage system 30. Therefore, if the communication path between primary storage system 28 and secure storage system 30 fails, this mirroring status can provide an indication whether the secure storage system is missing some data that was written to the primary storage system, and zero data loss recovery can therefore not be guaranteed.

In the configuration shown in FIG. 2, primary storage system 28 executes mirroring manager 76 to mirror data 74 to secure storage system 30 and to secondary storage system 34. In an alternative configuration, processor 58 can execute mirroring manager 76 from memory 60 in primary application server 26, and the mirroring manager on the primary application server can mirror data 74 to secure storage system 30 and to secondary application server 42 that stores the data on secondary storage system 34. In this alternative configuration, if the communication path between primary application server 26 and secure storage system 30 fails, this replication status can provide an indication whether the secure storage system missed some writes, and zero data loss recovery can therefore not be guaranteed.

As described supra, local site 22 may comprise multiple primary storage systems 28 that may store data 74 for primary application server 26. In configurations where primary application server 26 stores data 74 on multiple primary storage systems 28, the variables in the pseudo-code described supra can be redefined as follows:

$t_m$ is the minimum of all $t_{mi}$, where $t_{mi}$ is the time of a mirroring failure for the storage system i (i.e., a given primary storage system 28).

$t_D$ is the maximum of all $t_{Di}$, where $t_{Di}$ is the time of a failure of the storage system i.

In operation, processor 94 can compute a more accurate data loss estimate if, for example, the secure processor can identify based on log entries 132, that application 64 stops generating write operations due to a failure of a given primary storage system 28 (i.e., in configurations comprising multiple primary storage systems 28). In this case, $t_D$ can be the minimum of all $t_{Di}$.

In some configurations, mirroring manager 76 may manage more than one mirroring session for a given primary storage system 28. In this configuration, the given storage system can transmit, to secure storage system 30, respective statuses for each of the mirroring sessions. Since the different mirroring sessions may fail at different times, processor 94 can perform the computations described supra separately for each of mirroring sessions (i.e., using each of the respective failure times of the mirroring sessions). Using this information, processor 94 can determine respective data losses for each of the mirroring sessions.

Finally, in a notification step 190, processor 126 generates a notification for the computed data loss, and the method ends. For example, processor can present the notification, comprising the computed time period or the computed data loss, on UI device 140. Upon receiving the notification, a system administrator can start reconstructing (e.g., using the identified time period in the computed data loss), the lost data from other data sources that include, but are not limited to, paper audit trails, partial data collected from branch offices and inventory recounts.

As described supra, mirroring manager 76 may mirror data 74 to secure storage system 30 in local site 22. In some embodiments, circuitry 112 may assess the completeness of data 106 (i.e., the data mirrored to secure storage system 30) when computing the data loss.

In the example described in the flow diagram presented in FIG. 5, processor 94 transmits status log 42 to monitoring system 36, and processor 126 analyzes the transmitted status log to compute the data loss. In an alternative embodiment, processor 94 can analyze status log 42 to compute the data loss (i.e., steps 186 and 188), and to transmit the computed data loss to monitoring system 36. In a further alternative embodiment, any other computer (e.g., secondary application server 44) in remote site 24 can perform the steps presented in FIG. 5.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
receiving, by a secure processor housed in a disaster-proof casing located at a local site, recurring wireless signals from a primary application server and from a primary storage system that are collocated with the disaster-proof casing at the local site, the primary application server configured to store data to the primary storage system, and to mirror the data to a secondary storage system at a remote site, each of the wireless signals indicating a status of the primary application server or the primary storage system at a given time;
storing, to a memory in the disaster-proof casing, a status log comprising the respective statuses of the primary application server and the primary storage system at the received times; and
subsequent to failures of the primary application server, the primary storage system and the mirroring, analyzing the status log to compute a data loss at the local site resulting from the failures of the primary application server, the primary storage system, and the mirroring.

2. The method according to claim 1, wherein receiving the recurring wireless signals comprises receiving recurring application status signals from the primary application server and receiving recurring storage status signals from the primary storage system, and comprising transmitting, by the secure processor, periodic wireless status request signals, wherein the primary application server transmits a given application status signal in response to receiving a given status request signal, and wherein the primary storage system transmits a given storage status signal in response to receiving the given status request signal.

3. The method according to claim 2, wherein a time period between the periodic wireless status requests signals is less than or equal to an input/output timeout period for the primary storage system.

4. The method according to claim 1, wherein mirroring the data comprises the primary storage system mirroring the data to the secondary storage system at the remote site.

5. The method according to claim 4, wherein the status of the primary storage system comprises a status of the mirroring of the data to the remote site, and wherein the status of the mirroring comprises an amount of data not yet mirrored to the remote site.

6. The method according to claim 1, wherein the mirroring comprises asynchronous mirroring or synchronous mirroring.

7. The method according to claim 1, and comprising receiving additional wireless signals from one or more active data center components that are collocated with the secure processor at the local site, each of the additional wireless signals indicating a status of a given active data center component at a given time, and storing, to the status log, the respective statuses of the one or more active data center components at the received times, wherein computing the data loss comprises computing the data loss resulting from the failures, at different times, of the primary application server, the primary storage system, the mirroring, and the one or more active data center components.

8. The method according to claim 1, wherein the primary application server executes a software application, and wherein the status of the primary application server comprises the status of the software application executing on the primary application server.

9. The method according to claim 1, wherein the status of the primary application server comprises a status of the mirroring of the data to the remote site, and wherein the status of the mirroring comprises an amount of data not yet mirrored to the remote site.

10. The method according to claim 1, wherein storing the status log comprises storing, upon failing to receive within a specified time period, a wireless signal from the primary application server, an entry to the status log indicating a failure of the primary application server, and storing, upon failing to receive within a specified time period, a wireless signal from the primary storage system, an entry to the status log indicating a failure of the primary storage system.

11. The method according to claim 1, wherein the wireless signals comprise point-to-point wireless signals.

12. The method according to claim 1, wherein the data loss is less than or equal to the data written, by the primary application server to the primary storage system, between respective times of the failures of the mirroring and the primary storage system.

13. The method according to claim 1, wherein the data loss is less than or equal to the data written to the primary storage system between respective times of the mirroring and the primary application server.

14. The method according to claim 1, wherein the recurring wireless signals comprise first wireless signals, and wherein analyzing the status log comprises transmitting, by the secure processor, a second wireless signal comprising the data log to a monitoring processor at the remote site, and analyzing, by the monitoring processor, the transmitted status log.

15. The method according to claim 1, and comprising generating a notification comprising the determined amount of data.

16. The method according to claim 1, wherein the data loss comprises a time period or an amount of data.

17. The method according to claim 1, and comprising mirroring the data to a secure memory housed in the disaster-proof casing, wherein the computing the data loss comprises assessing a completeness of the data stored in the secure memory.

18. A data recovery system, comprising:
a disaster-proof casing;
a wireless transceiver contained within the disaster-proof casing and configured to receive recurring wireless signals from a primary application server and from a primary storage system that are collocated with the disaster-proof storage unit at a local site, the primary application server configured to store data to the primary storage system, and to mirror the data to a secondary storage system at a remote site, each of the wireless signals indicating a status of the primary application server or the primary storage system at a given time;
a memory contained within the disaster-proof casing;
a secure processor contained within the disaster-proof casing and configured to store, to the memory, a status log comprising the respective statuses of the primary application server and the primary storage system at the received times; and
circuitry configured to analyze, subsequent to failures of the primary application server, the primary storage system and the mirroring, the status log to compute a data loss at the local site resulting from the failures of the primary application server, the primary storage system, and the mirroring.

19. The data recovery system according to claim 18, wherein the secure processor is configured to receive the recurring wireless signals by receiving recurring application status signals from the primary application server and receiving recurring storage status signals from the primary storage system, wherein the secure processor is configured to transmit periodic wireless status request signals, wherein the primary application server is configured to transmit a given application status signal in response to receiving a given status request signal, and wherein the primary storage system is configured to transmit a given storage status signal in response to receiving the given status request signal.

20. The data recovery system according to claim 19, wherein a time period between the periodic wireless status requests signals is less than or equal to an input/output timeout period for the primary storage system.

21. The data recovery system according to claim 18, wherein the primary application server is configured to mirror the data by configuring the primary storage system to mirror the data to the secondary storage system at the remote site.

22. The data recovery system according to claim 21, wherein the status of the primary storage system comprises a status of the mirroring of the data to the remote site, and wherein the status of the mirroring comprises an amount of data not yet mirrored to the remote site.

23. The data recovery system according to claim 18, wherein the mirroring comprises asynchronous mirroring or synchronous mirroring.

24. The data recovery system according to claim 18, wherein the secure processor is configured to receive additional wireless signals from one or more active data center components that are collocated with the secure processor at the local site, each of the additional wireless signals indicating a status of a given active data center component at a given time, and to store, to the status log, the respective statuses of the one or more active data center components at the received times, and wherein the circuitry is configured to compute the data loss by computing the data loss resulting from the failures, at different times, of the primary application server, the primary storage system, the mirroring, and the one or more active data center components.

25. The data recovery system according to claim 24, wherein each of the active data center components is selected from a list consisting of a network switch, a storage area network director, a router and a firewall.

26. The data recovery system according to claim 18, wherein the primary application server is configured to execute a software application, and wherein the status of the primary application server comprises the status of the software application executing on the primary application server.

27. The data recovery system according to claim 18, wherein the status of the primary application server comprises a status of the mirroring of the data to the remote site, and wherein the status of the mirroring comprises an amount of data not yet mirrored to the remote site.

28. The data recovery system according to claim 18, wherein the secure processor is configured to store the status log by storing, upon failing to receive within a specified time period, a wireless signal from the primary application server, an entry to the status log indicating a failure of the primary application server, and storing, upon failing to receive within a specified time period, a wireless signal from the primary storage system, an entry to the status log indicating a failure of the primary storage system.

29. The data recovery system according to claim 18, wherein the wireless signals comprise point-to-point wireless signals.

30. The data recovery system according to claim 18, wherein the data loss is less than or equal to the data written by the primary application server to the primary storage system between respective times of the mirroring and the primary storage system.

31. The data recovery system according to claim 18, wherein the data loss is less than or equal to the data written, to the primary storage system, between respective times of the failures of the mirroring and the primary application server.

32. The data recovery system according to claim 18, wherein the circuitry comprises the secure processor.

33. The data recovery system according to claim 18, wherein the circuitry comprises a monitoring processor at the remote site, wherein the recurring wireless signals comprise first wireless signals, and wherein prior to analyzing the status log, the secure processor is configured to transmit, to the monitoring processor, a second wireless signals comprising the status log.

34. The data recovery system according to claim 18, wherein the secure processor is configured to generate a notification comprising the determined amount of data.

35. The data recovery system according to claim 18, wherein the data loss comprises a time period or an amount of data.

36. The data recovery system according to claim 18, wherein the circuitry is configured to compute the data loss by assessing a completeness of data mirrored, by the primary application server or the primary storage system, to the secure memory.

37. A computer software product, the product comprising a non-transitory computer-readable medium, in which program instructions are stored, which instructions, when read by a computer, cause the computer:
　to receive, by a processor housed in a disaster-proof casing located at a local site, recurring wireless signals from a primary application server and from a primary storage system that are collocated with the disaster-proof casing at the local site, the primary application server configured to store data to the primary storage system, and to mirror the data to a secondary storage system at a remote site, each of the wireless signals indicating a status of the primary application server or the primary storage system at a given time;
　to store, to a memory in the disaster-proof casing, a status log comprising the respective statuses of the primary application server and the primary storage system at the received times; and
　subsequent to failures of the primary application server, the primary storage system and the mirroring, to analyze the status log to compute a data loss at the local site resulting from the failures of the primary application server and the primary storage system, and the mirroring.

* * * * *